No. 777,064. PATENTED DEC. 13, 1904.
W. W. BENSON.
PRESSURE REGULATOR.
APPLICATION FILED FEB. 23, 1904.
NO MODEL. 3 SHEETS—SHEET 1.

WITNESSES:

INVENTOR
W. W. Benson
BY
Charles N. Butler
ATTORNEY.

No. 777,064.
Patented December 13, 1904.

UNITED STATES PATENT OFFICE.

WILLIAM W. BENSON, OF PHILADELPHIA, PENNSYLVANIA.

PRESSURE-REGULATOR.

SPECIFICATION forming part of Letters Patent No. 777,064, dated December 13, 1904.

Application filed February 23, 1904. Serial No. 194,978. (No model.)

*To all whom it may concern:*

Be it known that I, WILLIAM W. BENSON, a citizen of the United States, residing at Philadelphia, in the county of Philadelphia and State of Pennsylvania, have invented certain Improvements in Pressure-Regulators, of which the following is a specification.

This invention relates to mechanism operated by fluid-pressure for regulating a valve or the like; and its primary object is to provide therefor a simple and efficient mechanism avoiding the impulsive and vibratory action common to devices of this character.

Figure 1:
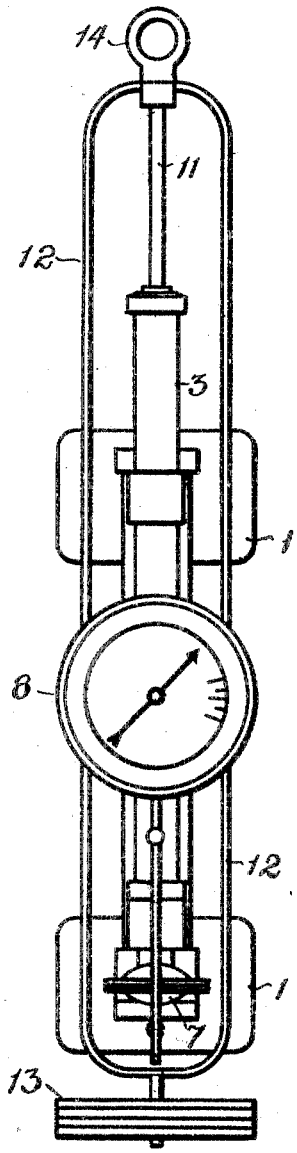
Figure 2:
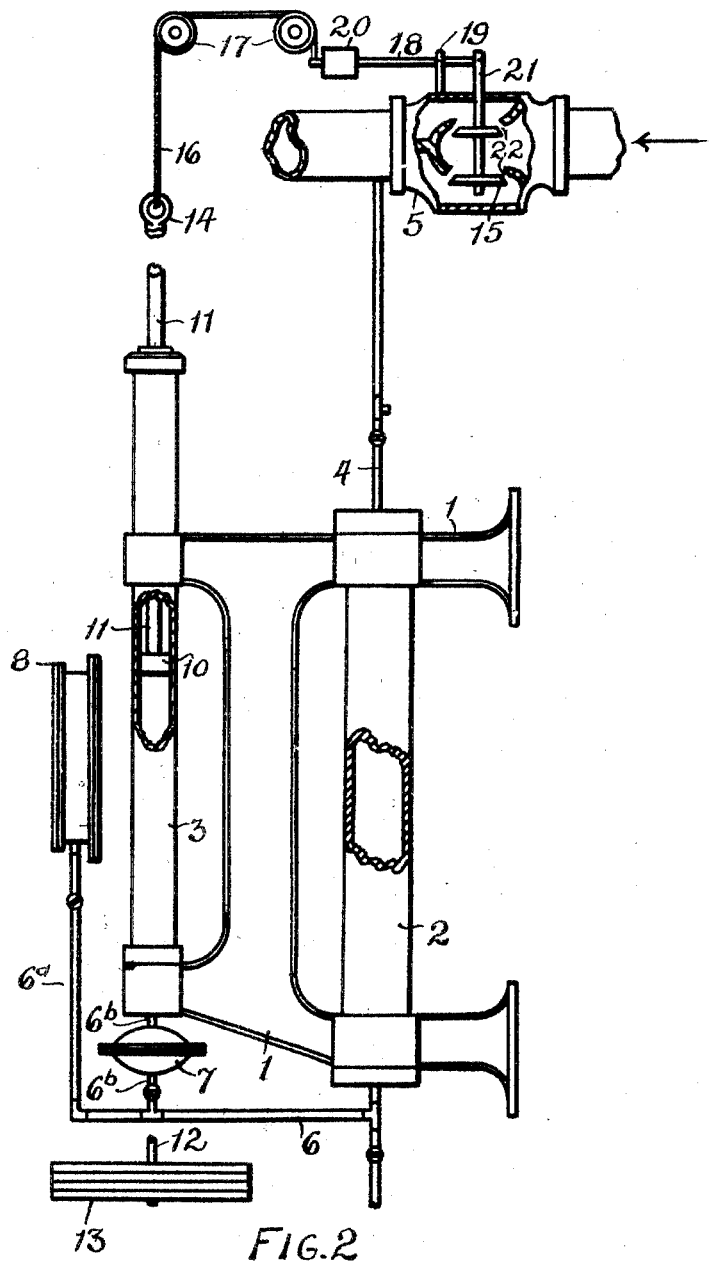
Figure 3:
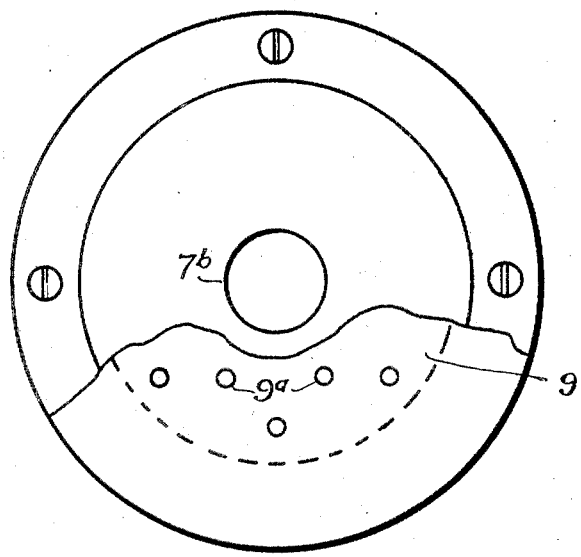
Figure 4:
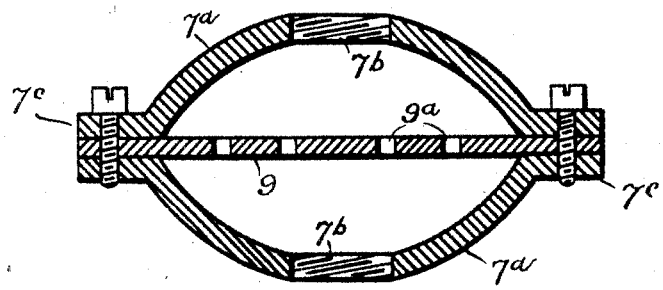

In the accompanying drawings, Figure 1 represents a front elevation of a regulator embodying my invention. Fig. 2 represents a side and partial sectional view thereof. Fig. 3 represents a plan and partial sectional view of the diaphragm-chamber, and Fig. 4 represents a vertical sectional view of the diaphragm and diaphragm-chamber.

As shown in the drawings, the frame 1 supports the cylinders 2 and 3, which act as pressure-reservoirs. The cylinder 2 is connected by a pipe 4 with a source of fluid-pressure 5 and by a pipe 6 $6^b$ and the diaphragm-chamber 7 with the cylinder 3, the pipe 6 being connected by a branch $6^a$ with a gage 8. The diaphragm-chamber 7, of approximately spheroidal contour, is formed by the semispheroidal walls $7^a$, having the threaded apertures $7^b$ for connecting the pipe-sections $6^b$, and the flanges $7^c$ for connecting them together and holding the diaphragm 9 having the perforations $9^a$ therethrough.

A piston 10, working in the cylinder 3, has its piston-rod 11 connected to a movable hanger or frame 12, which supports the weight 13. Through the piston-rod connection 14, the piston 10, and its balancing-weight 13 may be connected a regulating-valve 15 in any suitable manner, as by a cord 16, passing from the connection 14 over the pulleys 17 to the lever 18, having the fulcrum 19 and the weight 20, the lever being connected to the valve-stem 21, by which the valve 15 is caused to open and close the ports 22, leading to the pressure-chamber 5.

The connected pressure-reservoirs 2 and 3 contain water, and steam or other pressure from the chamber 5 is communicated through the pipe 4 to the column of water in the reservoir 2, by which the height of the column and the position of the piston 10 in the reservoir 3 is regulated, the height of the piston regulating the valve 15 and controlling the pressure in the chamber 5 through the cord 16 and lever 18. It will be understood that the weight 13 may be varied at will to balance, through the piston 10, the pressure which it may be desired to maintain. In the communication of changes of pressure between the reservoirs 2 and 3 the use of water, having comparatively little elasticity, provides for a steadiness of action which does not obtain where the pressure is communicated by a column or body of steam, gas, or air, and the perforated diaphragm 9 controls the tendency of the fluid to vibrate or act with sudden impulse.

Having described my invention, I claim—

1. In a regulator of the class described, a reservoir, a second reservoir having a fluid connection therewith, mechanism between said reservoirs for controlling the vibration of fluid therein, a piston in said second reservoir, a weight-hanger connected with said piston, and a valve connected with said piston, substantially as specified.

2. In a regulator of the class described, a reservoir containing a liquid, a second reservoir containing a liquid, a liquid-passage connecting said reservoirs, means in said passage for controlling the vibrations of said liquid, a piston movable in said second reservoir, a source of fluid-pressure connected with said first reservoir, a valve for controlling said fluid-pressure, and mechanism connecting said valve and piston whereby the movement of said piston regulates said valve, substantially as specified.

3. In a regulator of the class described, a cylinder, a reservoir, a piston in said cylinder, a weighted hanger connected with said piston, a valve connected with said piston, a fluid-passage connecting said cylinder and reservoir, and means for controlling the vibration of fluids in said cylinder, substantially as specified.

In testimony whereof I have hereunto set my hand, this 18th day of February, 1903, in the presence of the subscribing witnesses.

WM. W. BENSON.

In presence of—
UTLEY E. CRANE, Jr.,
R. J. SNYDER.